March 18, 1941.   G. R. BUNN   2,235,312
ATTACHMENT FOR HORSE COLLARS
Filed May 29, 1940
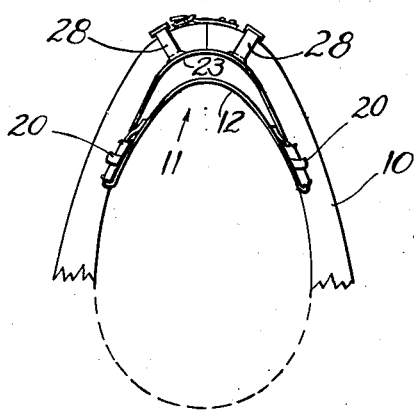
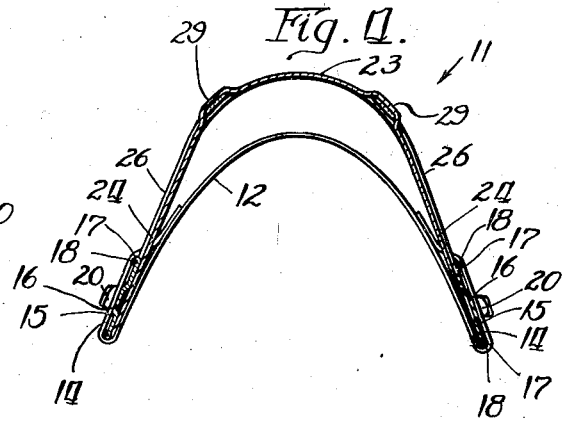
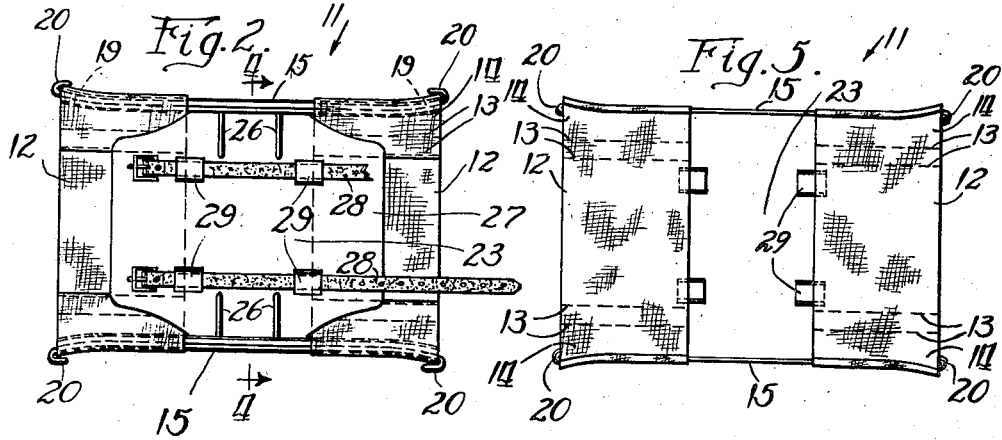
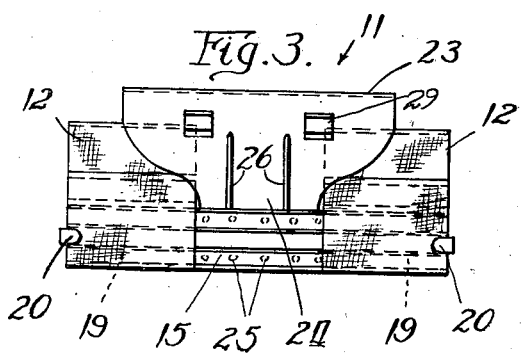
Inventor:
George R. Bunn.
By Brown, Jackson, Boettcher & Dienner
Attys.

Patented Mar. 18, 1941

2,235,312

UNITED STATES PATENT OFFICE 2,235,312

ATTACHMENT FOR HORSE COLLARS

George R. Bunn, Springfield, Ill.

Application May 29, 1940, Serial No. 337,733

2 Claims. (Cl. 54—67)

My invention relates, generally, to attachments for horse collars and it has particular relation to devices for properly positioning a horse collar on the neck of a horse.

An object of my invention is to provide for supporting a horse collar so that it will not cause the neck of the horse to become sore.

Another object of my invention is to so support a horse collar that it will not rub against the usual sore that has already been formed as a result of chafing of a horse collar of a conventional type.

A further object of my invention is to substantially uniformly distribute on the neck of a horse the downward thrust that is applied to a horse collar.

A still further object of my invention is to provide a shock absorber action between a horse collar and the neck of the horse.

Still another object of my invention is to prevent the direct application to the neck of a horse of the downward thrust on the horse collar by distributing the thrust over a relatively large area spaced from the direct line of the thrust.

Other objects of my invention will, in part, be obvious and in part appear hereinafter.

For a more complete understanding of the nature and scope of my invention reference may be had to the following detailed description taken in connection with the accompanying drawing, in which:

Figure 1 is a view showing my invention applied to a conventional type of horse collar;

Figure 2 is a top plan view of the attachment for the horse collar;

Figure 3 is a view, in side elevation, of the attachment shown in Figure 2;

Figure 4 is a detail sectional view taken along the line 4—4 of Figure 2; and

Figure 5 is a bottom plan view of the attachment shown in Figure 2.

Referring now particularly to Figure 1 of the drawing, it will be observed that the reference character 10 designates a horse collar of conventional construction. Ordinarily a horse collar of this type is positioned on the neck of a horse with or without a conventional pad underneath. Because of the chafing between the collar and the neck of the horse or because of the chafing between the conventional type of pad and the horse's neck, a sore spot is often developed which is only aggravated if no steps are taken to prevent further chafing. Various types of collar pads and protective devices have been devised in the past but, in so far as I am aware, none of them has ever been entirely satisfactory.

According to my invention I provide an attachment, shown generally at 11, for mounting within the collar 10 and supporting it in such a manner that the downward thrust thereof, instead of being directly applied to the neck of the horse, is distributed over a substantial area of the neck of the horse and away from the direct line of the thrust so that, if the neck of the horse has previously become sore, it is not further aggravated. Since the downward thrust is distributed over a substantially larger area than heretofore instead of being concentrated, I have found that there is little, if any, likelihood of chafing resulting when my improved attachment 11 is employed.

As shown more clearly in Figures 2, 3, 4 and 5 of the drawing, the attachment 11 comprises a pair of flexible straps or tension members 12—12 which are formed of suitable material such as canvas, rubberoid, elastic and other materials which have the quality of elasticity and give. The straps 12 are arranged to be placed over the neck of the horse in spaced apart relation and will be the only parts which will come into contact with the upper part of the neck of the horse.

The ends of the straps 12 are folded back on themselves and sewed along the seams 13 to form end loops 14 for receiving the ends of cross members 15.

Each of the cross members 15 is formed of suitable sheet metal such as sheet steel and is provided with a centrally located raised portion or rib 16 for increasing the rigidity thereof. Also, the edges 17 are rolled about wires 18 to further increase the rigidity. As indicated at 19, the ends of the cross members 15 are turned outwardly in order to conform more readily to the body of the horse. Tabs 20, integrally formed with the cross members 15 are turned back toward each other, as shown, in order to prevent the straps 12 from slipping out of place.

The cross members 15 are arranged to carry a collar support member 23 that is generally U-shaped in construction and, when in place, is inverted. The collar support member 23 is preferably formed of resilient sheet metal such as steel and the ends 24—24 are reduced in width and are secured to the cross members 15 by any suitable means, such as by spot welding as indicated at 25, Figure 3. If desired the collar support member 23 can be integrally formed with the cross members 15, the portions forming the latter being suitably constructed to provide the desired rigidity. If desired, ribs 26 may be formed in the sides of the collar support member 23 in order to increase its rigidity and resistance to compression.

It will be observed that the intermediate portion 27 of the collar support member 23 is substantially wider than the end portions 24 and that it projects over the intermediate portions of the straps 12. The collar support member 23 has located directly thereon the collar 10 so that the latter bears directly against the former. The collar 10 can be secured to the collar support member 23 by any suitable means such as by straps 28, which project through suitable up struck lugs or eyes 29 on the intermediate portion 27 of the collar support member 23. Instead of employing the up struck lugs, suitably shaped lugs can be secured to the collar support member 23 by riveting or welding.

It will now be obvious that the collar support member 23 is supported at its ends through the cross members 15 by the straps 12 as cantilevers with the main downward thrust being applied by the collar 10 to the intermediate portion 27. This thrust instead of being directly applied to the neck of the horse immediately below is instead transferred by the collar support member 23 acting as a compression member to the loops 14 at the ends of the straps 12, which acting as tension members distribute the thrust over a relatively large area of the neck of the horse. Since the collar support member 23 is inherently resilient in character, it, together with the straps 12, acts as a shock absorber and materially softens the blows which would otherwise be directly transferred to the neck of the horse as a result of corresponding movement of the collar 10. Because of the resilient effect provided by the collar support member 23, a limited pivotal action of the collar 10 is permitted which lessens the likelihood of the horse getting a sore shoulder. It will now be apparent that my invention not only permits the ready and quick healing of any sore which may have previously been present on the neck of the horse but also that it acts to prevent the formation of a sore at this point as well as the formation of sores on the shoulders.

Because of the relatively large area of the straps 12 and the intermediate portions of the cross members 15 that are in engagement with the sides of the neck of the horse, I have found that the attachment 11 tends to remain substantially stationary. Consequently, although the collar 10 may shift its position depending upon the rate at which the horse travels and the nature of the load, etc., the attachment 11 remains in place. This materially improves the ease with which the horse carries the collar 10 and of course lessens the likelihood of the development of sores, etc.

Since certain further changes can be made in the foregoing construction and different embodiments of the invention can be made without departing from the scope thereof, it is intended that all matter set forth in the foregoing description as shown in the accompanying drawing shall be interpreted as illustrative and not in a limiting sense.

I claim as my invention:

1. An attachment for collars for horses comprising, in combination, a pair of relatively wide flexible support straps adapted to fit over the neck of the horse in spaced relation, loops at the ends of said straps, rigid cross members carried by said loops on opposite sides of the neck of the horse, and a collar support member carried by said cross members and extending above the neck of the horse whereby the downward thrust of the collar is transmitted only to said cross members and thereby to said support straps.

2. An attachment for collars for horses comprising, in combination, a pair of relatively wide flexible support straps adapted to fit over the neck of the horse and engage the same in spaced relation, loops at the ends of said straps, rigid cross members with out-turned ends carried by said loops on opposite sides of the neck of the horse, means on said out-turned ends for preventing said loops from slipping off of the same, an inverted U-shaped resilient sheet metal collar support member fastened to and carried by said cross members and extending above the neck of the horse whereby the downward thrust of the collar is transmitted only to said cross members and thereby to said support straps, the intermediate portion of said sheet metal collar support member being substantially wider than the end portions and extending over intermediate portions of said straps, loop means on said sheet metal collar support member, and straps in said loop means for fastening the attachment to the collar.

GEORGE R. BUNN.